INVENTORS
VINCENT E. HEYWOOD
DONALD H. BUSHEY
WILLIAM A. CHAPMAN, JR.

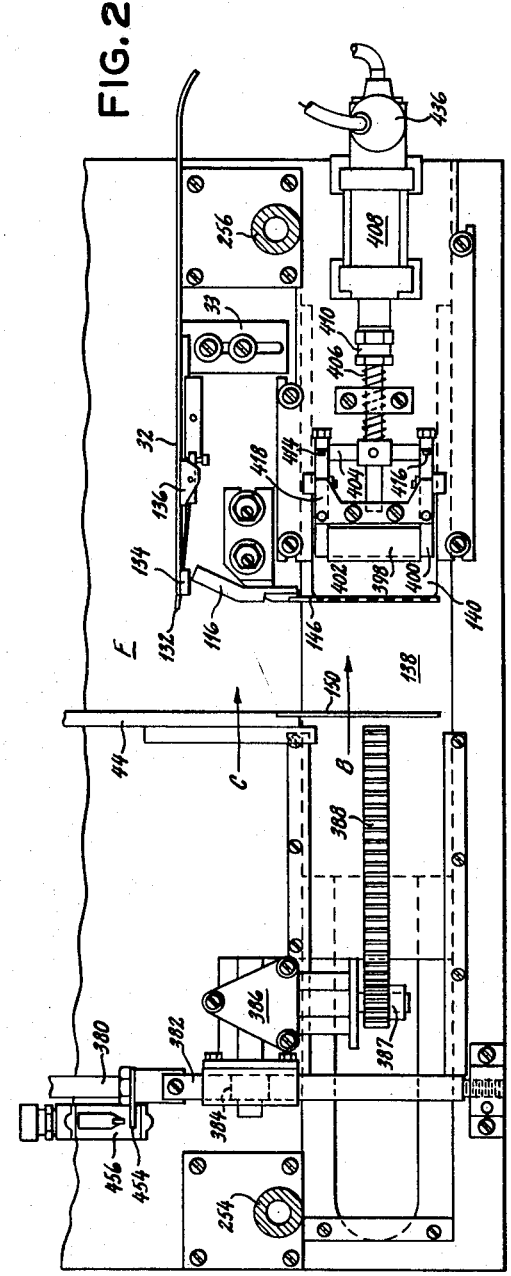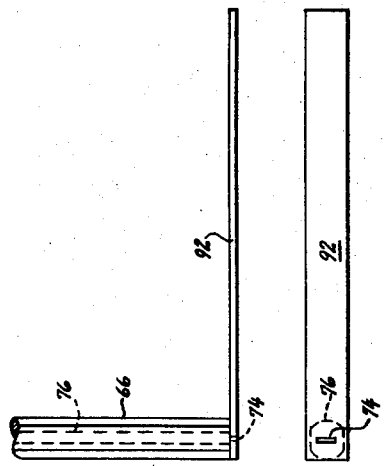

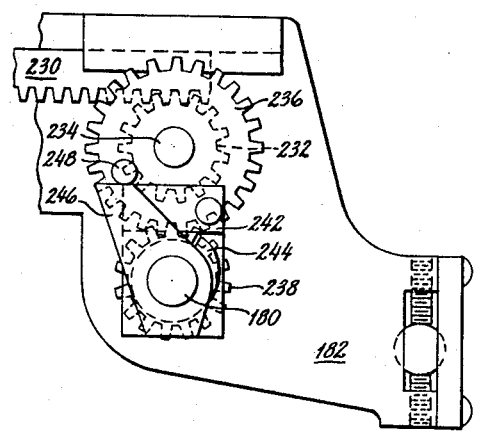
FIG.7
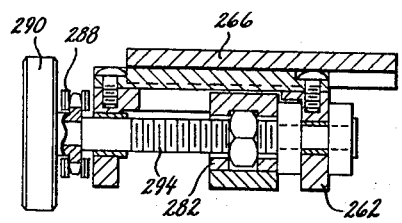
FIG.8
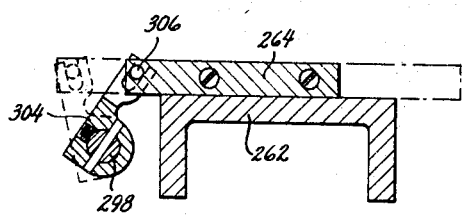
FIG.9
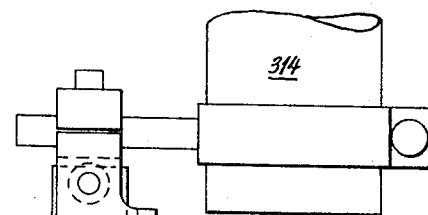
FIG.12
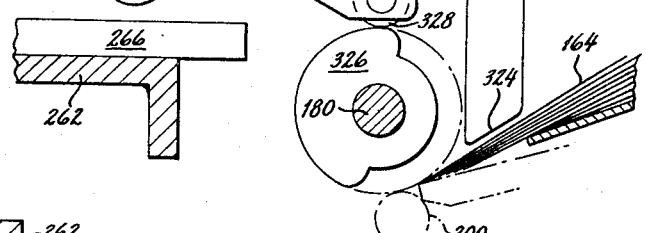
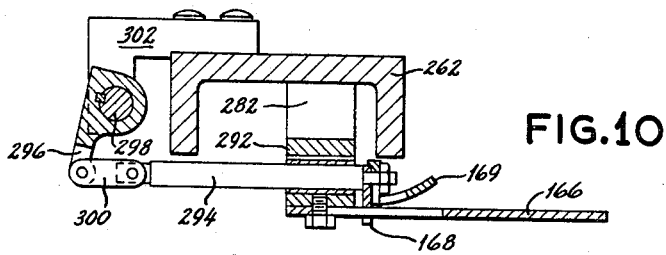
FIG.10

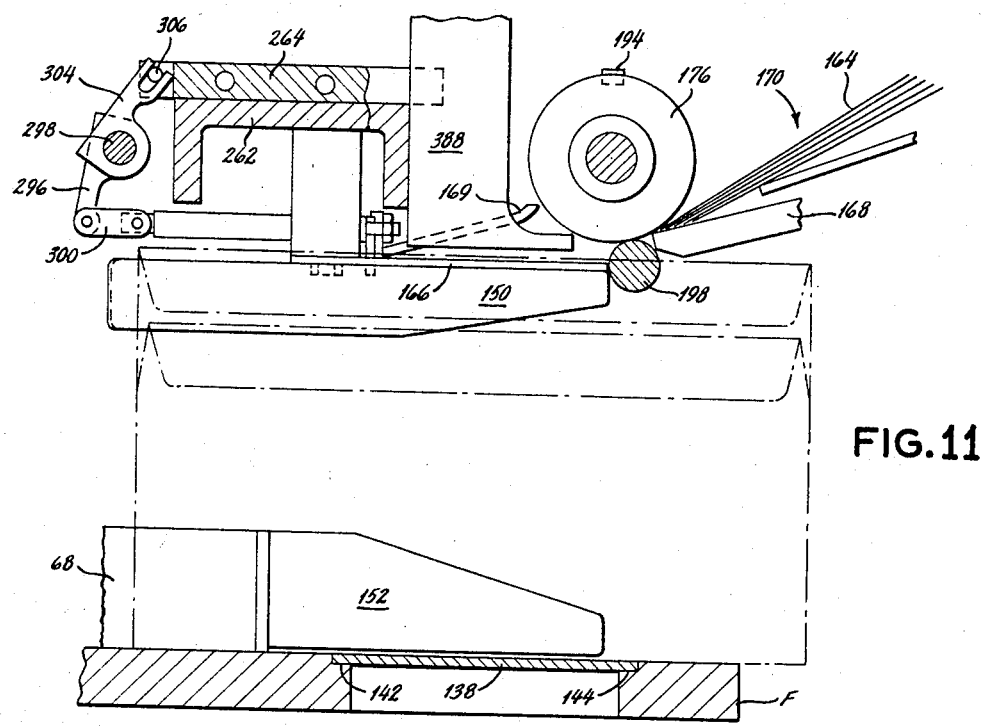
FIG. 11
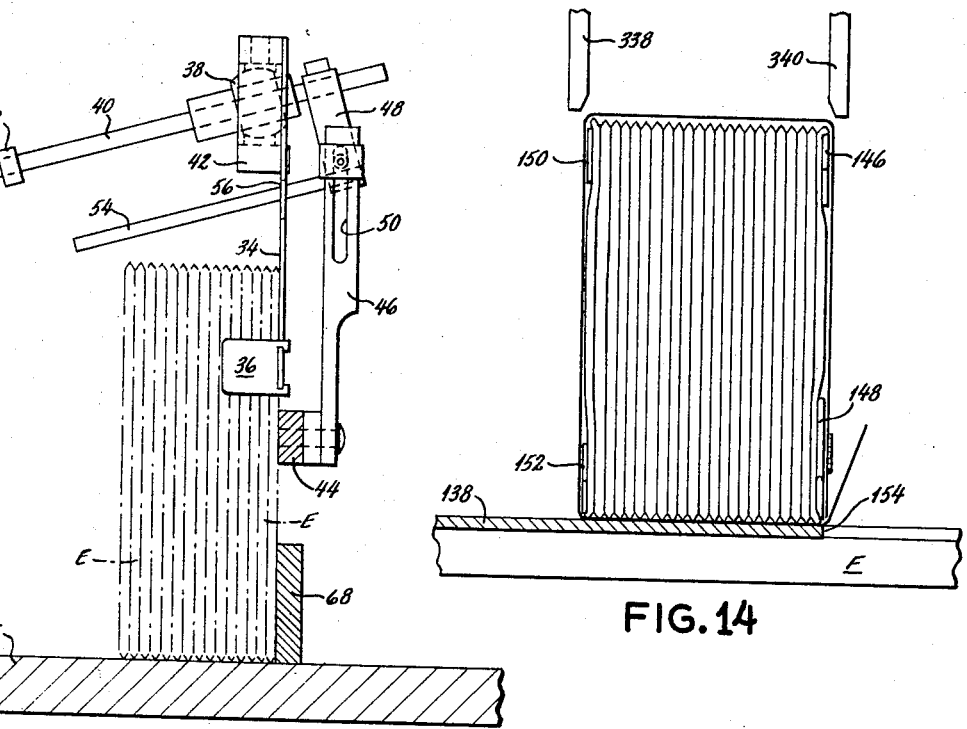
FIG. 13
FIG. 14

United States Patent Office 3,399,788
Patented Sept. 3, 1968

3,399,788
APPARATUS FOR HANDLING ENVELOPES
Vincent E. Heywood, Worcester, Donald H. Bushey, Shrewsbury, and William A. Chapman, Jr., Hubbardston, Mass., assignors to United States Envelope Company, Springfield, Mass., a corporation of Maine
Continuation-in-part of abandoned application Ser. No. 326,024, Nov. 26, 1963. This application Oct. 18, 1965, Ser. No. 502,759
16 Claims. (Cl. 214—8.5)

This application is a continuation-in-part of our copending joint application Ser. No. 326,024, filed Nov. 26, 1963, and now abandoned, for "Apparatus for and Method of Handling Envelopes."

This invention relates to an apparatus for and method of handling envelopes at the delivery end of an envelope making machine, from a point where the envelopes are ejected from the envelope making machine through a point where groups of the envelopes are banded, or packaged in some other similar manner.

This invention is especially applicable in the handling of so-called "fat" or "puff" folded envelopes, in which the folds or edges of the envelopes are not sharply defined, but are smoothly rounded, holding the front and rear panels in spaced apart relation. These "fat" folded envelopes have received fairly widespread acceptance, and today many of the higher quality greeting card envelopes, dry-sealing envelopes, and the like are fat folded to improve their appearance.

The most common means for making the well known fat folded envelopes is by a machine having the general characteristics disclosed in Winkler & Dunnebier Patent No. 2,019,946 in which the completed envelopes are delivered to a table at the end of the machine, and advanced in a succession in which the envelopes are supported on their edges in side by side relation with envelopes adjacent thereto. These envelopes are constantly being accumulated on a table at the upstream end next to the delivery section of the envelope making machine. It is necessary to maintain the succession of envelopes in a state of light compression for a period of time to permit drying of the seam adhesive. If the compression is relieved, the envelopes fail to properly connect at the seams. On the other hand, the succession must not be subjected to heavy compression because then the fat-folded envelopes would be crushed and the desired "puffy" effect would be lost. It is therefore most important in the handling of such envelopes that the pressure exerted on the envelopes in the succession be controlled to the extent that the pressure be high enough to permit proper connection along the seams of the envelopes. Because of this inherent problem in handling these fat-folded envelopes, envelopes delivered from the envelope making machine have been largely handled by hand in the past. It has not been uncommon to find several people working at the discharge end of these envelope making machines. It is obvious that such hand labor is much too costly for an efficient operation.

Accordingly, the main object of the present invention is to provide for the handling of envelopes from the point where they are ejected from the envelope making machine until they are banded, in a manner such that a generally constant pressure is exerted on the envelopes during this time. The term "generally constant pressure" is not intended to mean that the pressure is free from variation, but rather that the variation in pressure is small enough so as not to cause the harmful effect mentioned hereinbefore.

The invention also provides novel means and methods of segregating counted groups from the succession and transferring them into a packaging station while holding a generally constant pressure thereon, as well as a novel means and method of applying a band around the groups while holding the generally constant pressure on the group.

Although the invention is specifically applicable in handling the fat-folded envelopes, it is not limited thereto, as other types of envelopes and similar flat, flexible articles may also be effectively handled using the machine and method according to this invention. Also, this invention may be readily adapted to various types of delivery from the envelope making machine, and is readily adjustable for work on a wide range of sizes of envelopes.

The feature which sets this machine apart from envelope handling machines of this nature developed heretofore is its ability to handle wide ranges of sizes of envelopes and wide ranges of counts per group on many different types of envelope manufacturing machinery, while maintaining a generally moderate and constant pressure on the envelopes, so that they will neither be crushed by too much pressure, nor allowed to fall apart before the seam adhesive sets. In addition, the machine is unique in that its entire sequence of operation on a particular group of envelopes is set into motion by the group to be packaged being advanced to a point where it is detected by a sensing device on the machine.

In the drawings:

FIGURE 2 is a partial lower plan view taken substantially along line 2—2 of FIGURE 4, showing parts of the machine which are hidden in FIGURE 1.

FIGURE 5 is an enlarged plan view of portions of the group transfer assembly.

FIGURE 6 is an elevation view of the parts shown in FIGURE 5.

FIGURE 7 is an enlarged, partial elevation view taken along line 7—7 of FIGURE 1.

FIGURE 8 is an enlarged partial elevation view taken along line 8—8 of FIGURE 1.

FIGURE 9 is an enlarged, partial elevation view taken along line 9—9 of FIGURE 1.

FIGURE 10 is an enlarged, partial elevation view taken along line 10—10 of FIGURE 1.

FIGURE 11 is an enlarged, partial elevation view taken along line 11—11 of FIGURE 1.

FIGURE 12 is an elevation view taken along line 12—12 of FIGURE 1 showing the adhesive applying mechanism.

FIGURE 13 is an enlarged, partial elevation view taken along line 13—13 of FIGURE 1, showing the lead envelope position determining assembly.

FIGURE 14 is an enlarged end elevation view of the banding station of FIGURE 1.

FIGURES 15 through 22 inclusive are progressive sequence diagrammatic views showing the operation of the machine.

Figure 23:
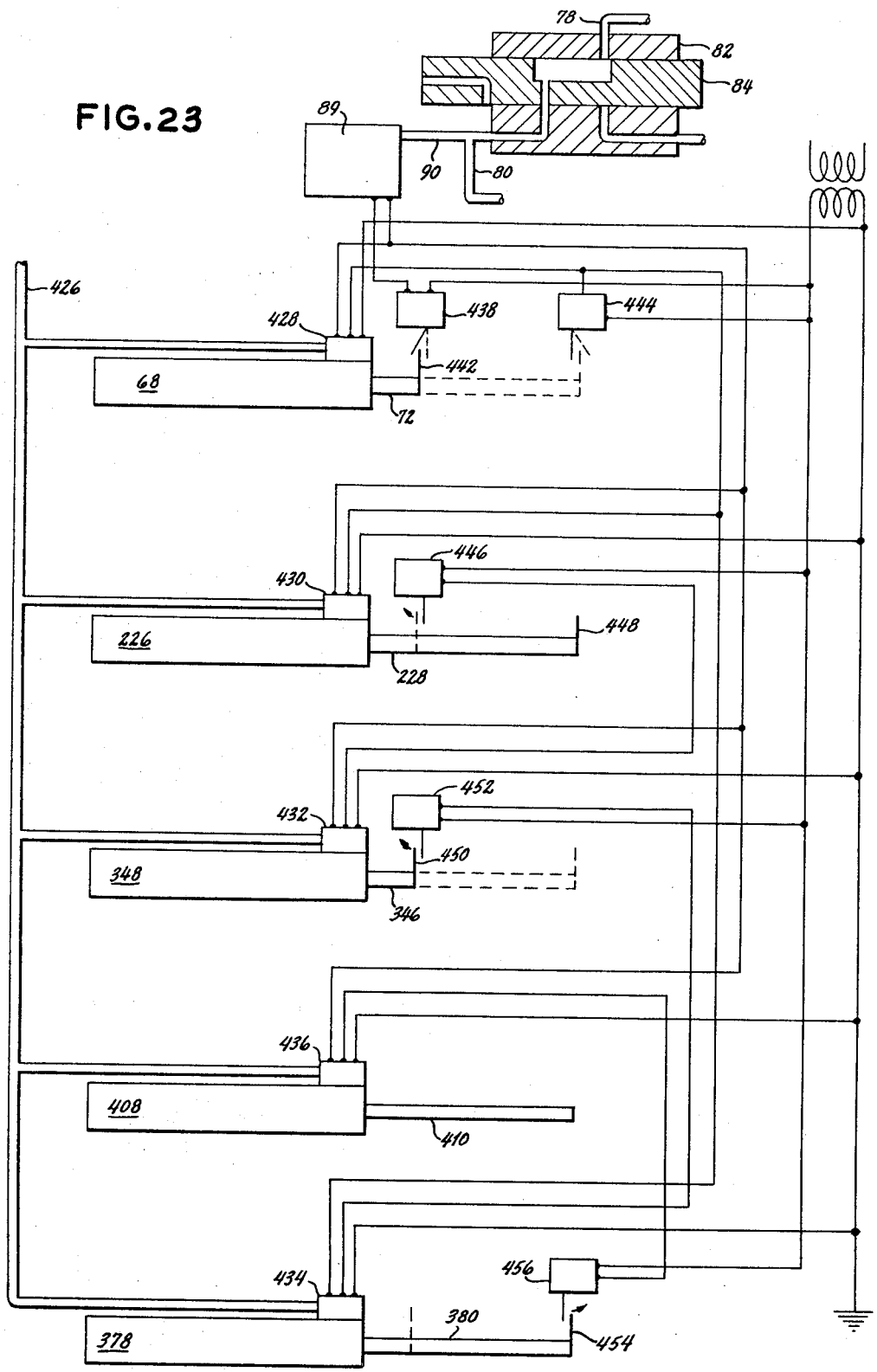

FIGURE 23 is a diagram illustrating the wiring and piping of the machine.

Figure 24:
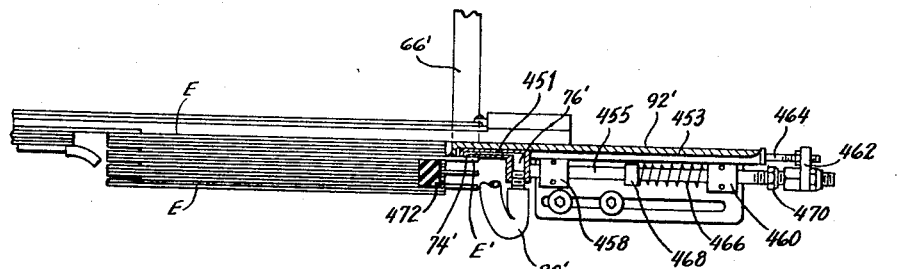

FIGURE 24 is a partial plan view of a modified group transfer mechanism.

Figure 25:
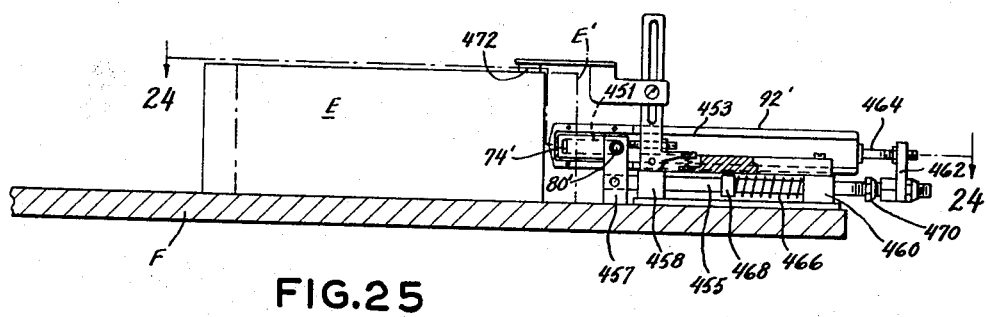

FIGURE 25 is an elevation view of the mechanism shown in FIGURE 24.

Figure 26:
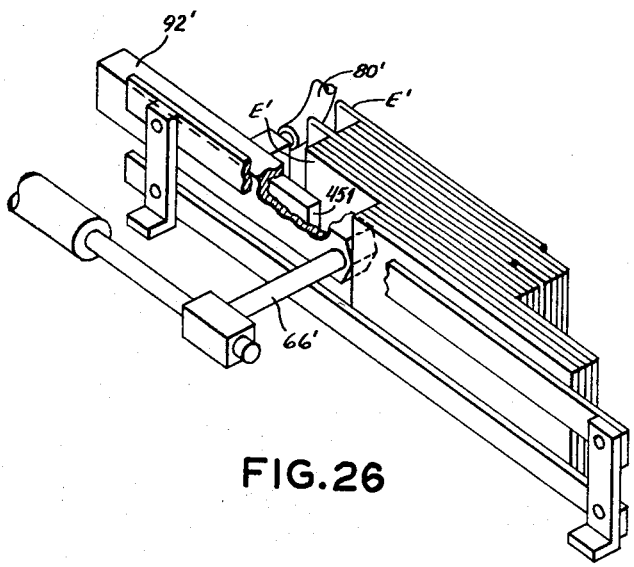

FIGURE 26 is a diagrammatic view similar to those of FIGURES 15 through 22 inclusive, illustrating the operation of the mechanism shown in FIGURES 24 and 25.

Introduction

Referring to the drawings, a preferred embodiment of the invention is illustrated in which the envelope handling machine is fully automatic, and is adapted to receive envelopes from the delivery end of an envelope making machine. The envelopes E are delivered successively by a mechanism on the envelope making machine (not shown) onto a main horizontal supporting plate F, such that each envelope E comes to rest on its edge in vertical position on plate F. Continuous accumulation of the envelopes on plate F near the delivery mechanism of the envelope making machine causes the succession to advance towards the envelope handling machine, i.e. downstream. Space on the plate F between the envelope making machine and the handling machine for a plurality of envelopes to accumulate is purposely allowed to provide for the efficient operation of the handling machine. Even though the succession is continuously flowing, that is, the freshly made envelopes are constantly being entered at the upstream end of the succession and groups of envelopes are periodically being removed at the downstream end by the envelope handling machine, the envelopes in the succession are maintained in a generally uniform state of moderate compression by a yieldable backstop P which advances as envelopes are accumulated at the upstream end of the succession while still maintaining back-pressure on the succession of envelopes.

It will be observed from the drawings that the succession of envelopes is composed of a plurality of adjacent groups G. The adjacent groups are defined by laterally offset envelopes E' which form the last, or rear-most envelope of each successive group G. Each envelope E' is automatically counted as it leaves the envelope making machine and upon delivery of a predetermined number, a "count" envelope E' is laterally offset to designate a group of a certain number of envelopes. This type of delivery and offsetting of count envelopes is well known in this art, and it has been the practice for many years to so-designate the successive groups of predetermined numbers for convenience in banding the groups of envelopes by hand.

According to this invention, the offset envelopes E' are detected and the groups defined thereby are automatically removed from the succession and transferred to a station where the group is banded, or packaged in another manner, while maintaining a substantially constant and moderate pressure on the envelopes during the complete operation. As each forward-most group G is removed from the succession, the backstop P finds the next leading envelope E of the succession, and allows it to advance under a predetermined back pressure in a path perpendicular to the planes of the envelopes as freshly made envelopes accumulate at the envelope making machine end of the succession. When the forward-most group G has advanced to a position for transfer to the banding station, the offset envelope E' of that group is detected by a suction device integral with a transfer member generally denoted by H. Upon so detecting the offset envelope E', the suction continues to act on and hold envelope E', and at the same time triggers a sequence of operations which, automatically transfers the leading group G through a chute section C along a path at substantially right angles to the original path of the envelopes in the succession, into a banding station B where a pre-cut and pre-gummed band is wrapped around the group. The banding station B is provided with members for holding the envelopes in the group to be banded upright on edge while a band, which had been previously placed in a horizontal position above the banding station, is first entrained downwardly along the vertical sides or heights of a group, then across the bottom thickness of the group and finally connected at its ends at a lower side edge of the group. The suction on the offset envelope E' by this time has been released and the transfer member H has returned to its original position to wait for the next group G to be transferred. During the cycle of the transfer mechanism H, the next leading envelope in the succession is held back from further advancement and the yieldable backstop P moves forward to apply moderate back pressure to this next forward-most envelope in the succession. The banding station B is cleared of the banded group by the succeeding group G which, during entry into the banding station B, positively pushes it through the other end.

Lead envelope position determining means

As the succession of envelopes advances of plate F between the side rails 30 and 32, the yieldable backstop P normally determines the position of the leading envelope in the succession by applying back pressure thereon. Side rails 32 are mounted to plate F by means of adjustable bracket 33. The backstop P includes a bar or plate 34 which normally assumes a position of rest at its extreme upstream position. As successive envelopes accumulate in the succession, the forward-most envelope bears against the plate 34 which is yieldable under pressure in the direction of advancement of the succession.

As best shown in FIGURE 13, the plate 34 is positioned crosswise in relation to the path of the succession of envelopes, and generally parallel to the planes of the envelopes. A vertical element 36 may be fixed to the side of plate 34 to aid in keeping the envelopes in line during advancement. Plate 34 is movable in the direction of the arrow, by means of its mounting to bearing 38 which is slidable on shaft 40. The bracket 42 which connects plate 34 to bearing 38 is angularly adjustable relative to the centerline of bearing 38, so that regardless of the angle of inclination of the shaft 40 to the horizontal plate F, the plate 34 may be adjusted to be perpendicular thereto.

The backstop assembly P is supported from the top rail 44 by upright member 46. The bracket 48 which carries the rod is adjustable vertically in slot 50 of upright ries the rod 40 is adjustable vertically in slot 50 of upright member 46, and is also adjustable angularly to vary the inclination of shaft 40. The amount of back pressure created by the plate 34 acting on the leading envelope E can be varied by changing the angle of inclination of shaft 40, because it is the gravitational force acting on the sliding assembly which produces back pressure on the succession of envelopes. The extreme positions of bearing 38 along shaft 40 are determined by the position of collar 52 at the upstream end, and by bracket 48 at the downstream end. Shaft 54 is generally parallel to shaft 40 and extends through an opening 56 in plate 34, thereby preventing excess rotation of plate 34 about shaft 40. The amount of movement of plate 34 should be at least as great as the thickness of the groups G being banded. It may readily be seen that as the succession forces the plate 34 back to its down-stream-most position, removal of the group G immediately upstream from plate 34 allows the plate 34 to move to its upstream-most position to again apply pressure to the envelope succession.

Group detecting and transferring means

The means for detecting the presence of a group G of envelopes which has advanced to a position ready to be moved to the banding station B, and the means for so-transferring this group to the banding station B are so closely related physically that they will be described together. The detecting and transferring mechanism is indicated generally at H and includes a reciprocative bar 66 having a side closely disposed to the vertical sides of the envelopes E ahead of the offset count envelope E', on the side of the succession opposite the banding station B. The bar 66 extends between the horizontal top backing rail 44 and bottom backing rail 68, the space between the rails being useful as an opening to allow reciprocation of bar 66 in a horizontal plane across the path of the succession of envelopes. The end of bar 66 lying upstream in relation to the succession is located generally opposite the upstream side of the transfer chute C and banding station B, while the body of the bar 66 lies opposite the chute C and banding station on the opposite side of the succession.

Means for imparting horizontal reciprocating movement to bar 66 is provided by double acting air cylinder 68 fixed to plate F. Bar 66 is carried by block 70, and block 70 in turn is fixed to piston rod 72 of the air cylinder 68. As the bar 66 is moved horizontally toward the banding station B the side thereof intercepts the edges of all the envelopes in group G, except for the offset envelope E'. As bar 66 continues its movement, it pushes against the edges of the envelopes in its path, moving them through chute C and into banding station B. The stroke of the piston rod 72 is such as to correctly position the group of envelopes in banding station B. Upon completion of the transfer stroke, the air cylinder 68 retracts piston rod 72 to return bar 66 to its original position. Automatic means for actuating the air cylinder on each stroke will be explained hereinafter.

Means for transferring the offset envelopes E' along with the group to which they belong is actually incorporated into the group detecting means. The successive forward-most groups G will be transferred to the banding station B periodically as successive forward-most envelopes of the succession advance a distance about equal to the thickness of a group. To detect the presence of the successive groups when they have advanced to a position ready for transfer to the banding station, the bar 66 is provided with a vacuum port 74 at its upstream end. Leading to the vacuum port 74 is opening 76 extending through bar 66. Vacuum line 78, connected to a vacuum source (not shown) is also connected to vacuum line 80 which leads to opening 76, by slide valve 82, which is also mounted to piston rod 72 for reciprocation therewith. Slide valve 82 is controlled by rod 84, and is open when rod 84 is forced in one position by bracket 86, or closed if the rod 84 is forced in another position by contacting bracket 88.

Figure 1:
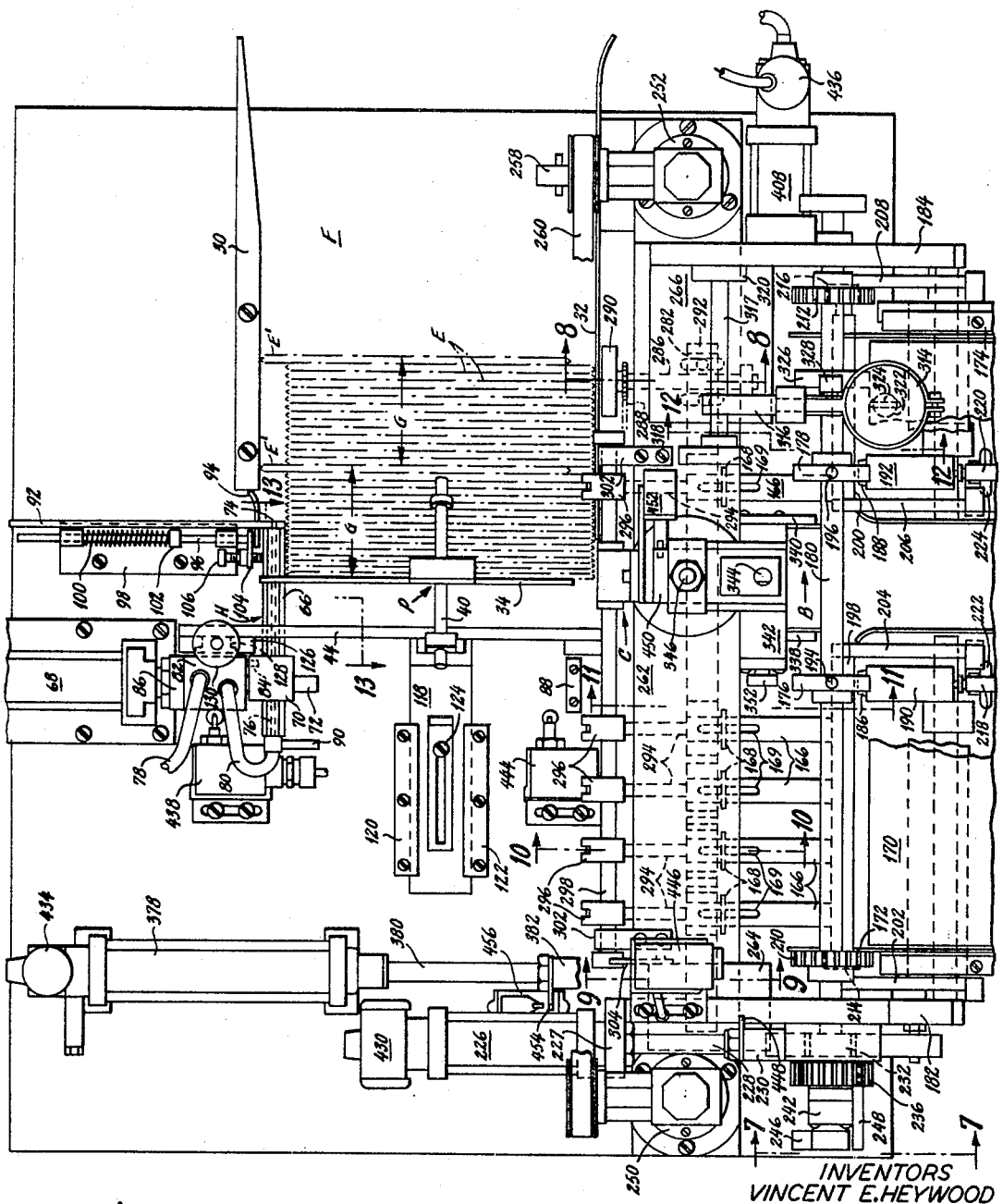
FIGURE 1 is a plan view of the envelope handling machine according to this invention.
Figure 3:
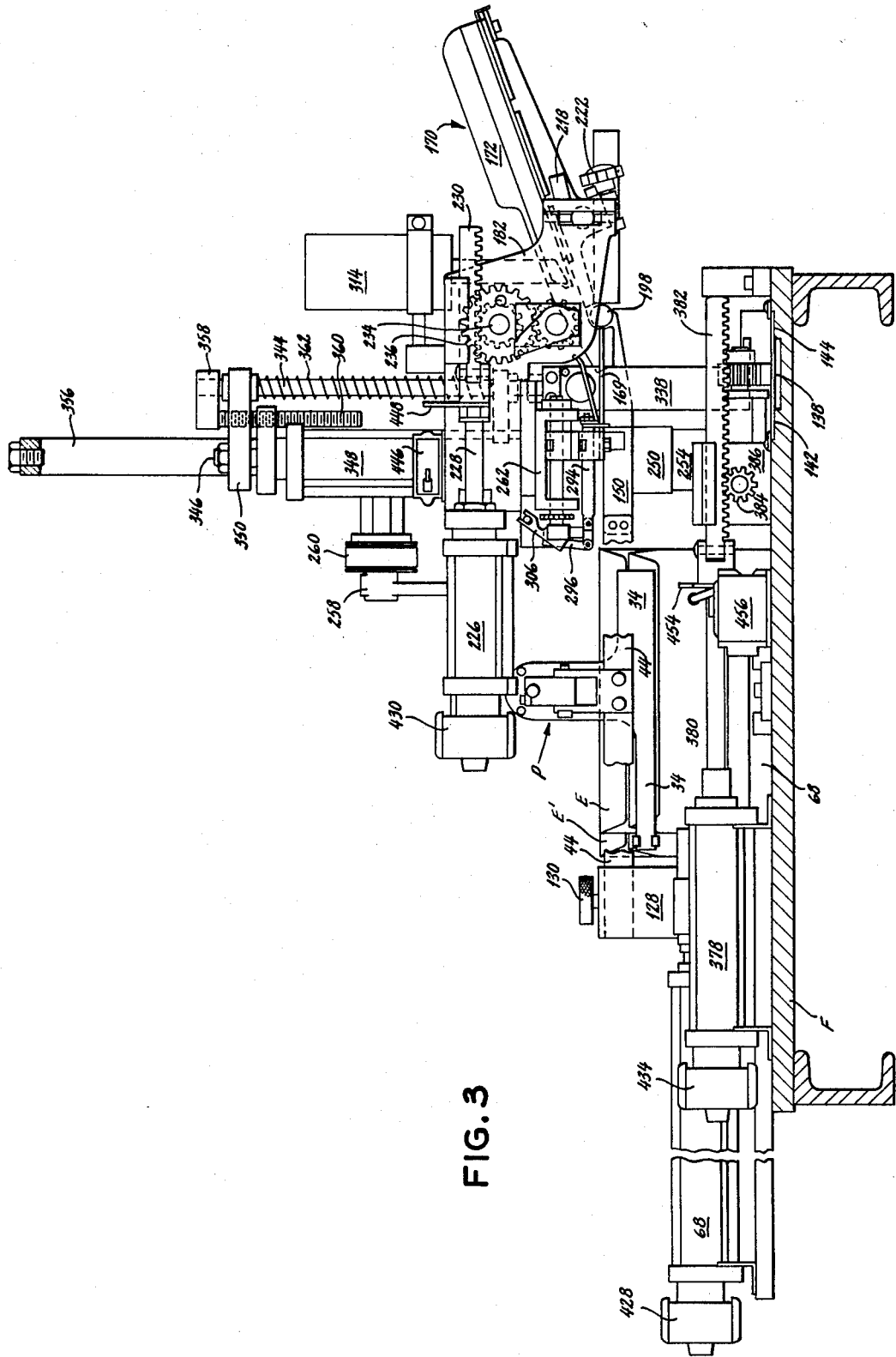
FIGURE 3 is a side elevation view of the envelope handling machine according to this invention.

When the piston rod 72 is in its retracted position as shown in FIGURE 1, air is being drawn through port 74. As an offset envelope E' comes into contact with the vacuum port 74, the offset portion of envelope E' is drawn into grasping contact with the end of bar 66, cutting off the vacuum line's opening to the atmosphere, and creating a vacuum in the vacuum lines. This vacuum is transmitted to a pressure switch 89 (shown only in the diagram of FIGURE 23) by means of line 90 extending from the valve 82. The pressure switch, sensing the drop in pressure, triggers the group transferring and banding operations, one of the first of which is to cause air cylinder 68 to move the bar 66 towards the banding station. It will be noted that in the meantime, offset envelope E', continues to be held to the end of bar 66 by the vacuum therein, and hence the offset envelope E' will be moved along with the rest of the group when the bar 66 moves toward the banding station B. It will also be observed that when the slide valve reaches its position near the banding station, rod 84 will close valve 82 releasing the hold on envelope E' by opening the vacuum line to the atmosphere when it meets block 88.

The bar 66 has rigidly fixed thereon a second bar 92 extending at substantially right angles thereto and away from the succession of envelopes. During the transferring stroke of bar 66, the bar 92 is carried into the path of the advancing succession to prevent further forward movement thereof during reciprocation of bar 66. This is to prevent the succession from advancing into the return path of bar 66. While the next forward-most envelope is under the influence of the yieldable backstop P, the back pressure caused thereby is not sufficient to prevent advancement of the succession. Obviously if invelopes were in the return path of bar 66, the next group to be banded would be disrupted. Once the bar 66 is returned to its original position, the leading envelope of the succession is then entirely under the influence of the yieldable backstop P, and the succession is again allowed to slowly advance. Reciprocation of bar 66 is relatively fast compared with the rate of accumulation of the envelopes in the succession; hence, no appreciable increase in back-pressure is caused by the stopped forward movement of the succession during this time.

During the return stroke of the detecting and transferring assembly, bar 92 may have a slight tendency to misplace some of the forward-most envelopes in the succession. To prevent any possibility of this happening, a spring loaded element 94 is provided beside the succession. The element 94 is fixed to the end of rod 96 which is slidably mounted in bracket 98 fixed to plate F. Normally, spring 100 urges the rod to a position adjacent the edge of the succession, by bearing against collar 102. However, arm 104 is fixed to rod 96, and screw 106 as carried thereby rests against bar 66, so that when the bar 66 is in its normal position shown in FIGURE 1, the rod 96 is held in retracted position against the force of spring 100. When bar 92 moves toward the banding station, the element 94 is allowed to assume its position adjacent the edges of the envelopes in the succession. On the return stroke, element 94 remains in that position until the bar 66 contacts the screw 106 and resets the element 94 to the position shown in FIGURE 1.

*Transfer chute and banding station*

The transfer chute and banding station are probably best illustrated in FIGURES 1 and 2. Here, it can be seen that the groups of envelopes are removed from the forward-most end of the succession, and are pushed through the chute section C on their way to the banding station B. The bottom of the chute C is formed by the horizontal plate F, and one side is formed by continuation of the backing rails 44 and 68. The other side of the chute is formed by guide member 116, which is attached to plate F as illustrated.

The backing rails 44 and 68 are adjustable in a direction perpendicular to the planes of the envelopes in the succession by means of their mounting to plate F by the adjustable sliding bracket 118. Bracket 118 may slide in this direction, between the guide bars 120 and 122 when screw 124 is loosened. The bottom backing rail 68 is fixed to bracket 118, and the top backing rail 44 is connected to bottom backing rail 68 at post 126. Post 126 contains a vertically adjustable member 128 to which the top backing rail 44 is fixed, and may be adjusted vertically by means of knob 130. The above mentioned adjustments of the backing rails 44 and 68 provide convenient means for adapting the machine to different sizes of envelopes, as well as different sizes of groups to be banded.

At the forward-most end of the guide rail 32 near the entrance to the transfer chute C, there is supported a piece of resilient material 132, such as rubber, extending generally parallel to the side edges of the envelopes in the succession. The material 132 is longitudinally adjustable at its mountings 134 and 136, and serves the purpose of providing resistance during transfer of a group, to any envelope upstream of the group being transferred, thereby keeping the forward end of the succession in alignment during transfer of a group.

The transfer chute C leads directly into the banding station B, where the group of envelopes to be banded is brought to rest at the end of the transfer stroke of bar 66. The group of envelopes is supported in the banding station B on the bottom by the horizontal plate F, and by an elongated sliding plate 138 contained in opening 140 of plate F and supported by the ledges 142 and 144 so that the top of the sliding plate 138 and the top of the plate F are flush. The width of the sliding plate 138 and the opening 140 in plate F are so related that the bottom of the banding station B is substantially continuous and smooth when sliding plate 138 is in a closed position.

The means for supporting the sides of the group of envelopes in the banding station include the thin prongs or blades 146 and 148 on one side and 150 and 152 on the other. Blades 146 and 148 are mounted to rail 116, the top blade 146 being vertically adjustable for different sizes of envelopes, and the blades 150 and 152 are mounted to the backing rails 44 and 68 respectively. By adjusting the rails 44 and 68 as hereinbefore mentioned, blades 150 and 152 will be automatically adjusted therewith. The blades 146, 148, 150 and 152 are mounted to their respective supporting members so that the passageway between the chute C and banding station B is substantially continuous.

Sliding plate 138, which in conjunction with the plate F supports a group of envelopes in the banding station B, is normally in a closed position, that is, forming a continuous bottom in the banding station B. However, to aid in folding a band around the group, plate 138 is reciprocable in the opening 140, and in the closed position, the folding edge 154 of plate 138 is positioned just below the blade 148.

Lateral movement of bar 66 in transferring the groups of envelopes to the banding station B is effective to substantially center the groups lengthwise over the sliding plate 138. After a group has come to rest in the banding station B, the plate 138 may be withdrawn without affecting support of the group because the ends of the group will be supported by the plate F along the sides of the opening 140, i.e. the group will be straddling the opening 140.

Instead of folding a band around the group of envelopes held by the blades 146, 148, 150 and 152, the segregated group may be pushed into a box, or the like, provided the compression on the group is not released during the operation. A box positioned just out from the ends of the blades 146, 148, 150 and 152, may receive the group of envelopes. The blades 146, 148, 150 and 152 in this case, would be useful as guides for the group of envelopes entering the box. The box in this instance would desirably be of a width slightly greater than the thickness of the group of envelopes. Suitable conveyor means may be provided for feeding successive boxes into position. It is believed, however, that the novel means for banding the group of envelopes described herein is the most desirable means of "packaging" the envelopes, the term "packaging" being intended as a broad term which includes "banding."

*Band feeding and gumming*

As a group of envelopes is transferred to the banding station B, the band 164 to be wrapped around that group is fed into horizontal position above the banding station B, the longer dimension of the band being crosswise of the top blades 146 and 150. Several spaced horizontal supporting members 166 are located above the banding station B, and on both sides thereof to provide horizontal support for the bands and band stops 168 are also provided to insure that the bands 164 will be positioned squarely above the banding station B. Fingers 169 are also provided to aid in guiding a band into position.

The bands 164 are positioned in the hopper 170 so that when they are fed directly onto the supporting members 166, they will be in the longitudinal position of extending beyond one side of the banding station an amount substantially equal to the height of the group of envelopes as they stand upright, and on the other side, extending beyond the banding station by an amount slightly greater than the combined height and width, or thickness of the group. The term "slightly greater" is intended to mean an amount sufficient to overlap the other end of the band to form a seam.

One desirable way of feeding the bands 164 into position on the supporting members 166 is illustrated in the drawings. A supply of bands 164 are placed on edge in an inclined hopper, generally denoted by 170, in a slightly fanned-out relationship, so as to feed downwardly as the lower bands are removed from the hopper 170. The hopper 170 includes upright side plates 172 and 174 for keeping the bands 164 in lateral alignment. At the lower end of the hopper 170, above the bands therein, there are provided feed wheels 176 and 178 mounted on shaft 180 which is rotatably mounted in the side frame members 182 and 184. Just below each of the feed wheels 176 and 178, there are provided pieces of frictional material 186 and 188, such as rubber, mounted in the supports 190 and 192. When the feed wheels 176 and 178 are rotated clockwise, as viewed in FIGURE 11, the pads of frictional material 194 and 196 carried thereby contact the lower band 164 in the hopper 170, and carry the leading edge thereof past the ends of the pieces 186 and 188, which are in touching relation with the feed wheels 176 and 178 respectively, into the nips which feed wheels 176 and 178 form with the lower feed rolls 198 and 200 respectively. The lower feed roll 198 is rotatably mounted in the arms 202 and 204, and lower feed roll 200 is mounted in arms 206 and 208. Gears 210 and 212, fixed to shaft 180, mesh with gears 214 and 216 respectively, to rotate the lower feed rolls 198 and 200 at the same time, and with substantially the same speed and direction as the feed wheels 176 and 178. Once a band 164 is caught in the nip of the feed rolls and wheels, it is fed onto the horizontal supporting members 166, and the leading edge of the band 164 comes to rest against the stops 168. In this manner, the band 164 is conveniently brought into correct position for folding around the group, by feeding broadwise onto the supporting members 166, and correct register or alignment for folding is easily attained. Travel distance of the band 164 from the hopper 170 to position on the supporting members 166 is very short. The band is therefore given very little chance to be wind deflected out of orientation. Since the band 164 begins its movement correctly oriented, and any possible deflections are minor, the stops 168 insure that the band will come to rest in correct register or orientation to be folded around the group. Means for adjusting the longitudinal position of the pieces 186 and 188, thereby varying the distance between the end of the pieces and lower feed rolls 198 and 200 are provided by the adjusting thumbscrews 218 and 220 respectively. Also, means for adjusting the pressure of the pieces 186 and 188 against the feed rolls 176 and 178 are provided by the adjusting knobs 222 and 224.

Single revolution drive means are provided to the feed wheels 176 and 178, and feed rolls 198 and 200 by double acting air cylinder 226, which is fixed to side frame member 182 by means of bracket 227. Carried by the piston rod 228 thereof is a rack 230 which meshes with pinion 232, which is fixed to shaft 234 as best shown in FIGURE 7. Gear 236 is also fixed to the shaft 234, and meshes with gear 238 which rotates freely about shaft 180 on hub 240. Hub 240 also carries a pawl 242, which is adapted to rotate in axial alignment, and cooperate with the ratchet 244. A single stroke of the rack 230 is sufficient to rotate pawl 242 a full revolution. During the power stroke of the piston rod to which rack 230 is mounted, the pawl 242 and ratchet 244 are engaged so that the feed wheels 176 and 178, and hence feed rolls 198 and 200, rotate in a direction to feed a band out of the hopper 170, i.e. a stroke of rack 230 rotates feed wheels 176 and 178 one revolution clockwise, and feed rolls 198 and 200 counterclockwise, as viewed in FIGURE 11. A block 246, fixed to shaft 180 is provided for contacting pin 248 to prevent overrun of the shaft 180.

The entire band supply, feeding, and supporting structure is held above the plate F by two upright posts. The upper post elements 250 and 252 are slidably engaged with the lower post members 254 and 256, respectively, and are vertically adjustable thereon by means of crank 258 which is linked to both posts by means of belt 260. The supporting channel member 262 is horizontally held above plate F by means of its mounting of its mounting to the upper post members 250 and 252. The side supporting members 182 and 184 are mounted to plates 264 and 266 respectively, which are slidably mounted to the top of the channel member 262 for horizontal movement with respect thereto in a direction perpendicular to the length of channel member 262.

For different widths of bands, it may be necessary to change the position of the entire band feeding and supporting assembly, as well as the position of the band stops 168. This adjustment can be made by sliding the plates 264 and 266, and the assembly carried thereby, horizontally in the direction perpendicular to the length of the channel member 262. For example, for relatively wide bands, the band feed wheels and rolls may need to be a greater distance away from the band stops than for relatively narrow bands. Means for so moving plates 264 and 266 are provided, but to avoid undue complexity of the drawings, the mechanism for moving plate 266 is illustrated, while the mechanism for moving plate 264 is omitted, it being understood, however, that similar mechanisms may be used for moving both plates, and as a practical matter, the plates move in unison, as the respective motion imparting mechanisms are connected by means of chain 288. For moving plate 266, threaded block 282 is provided just under the channel member 262 which communicates directly with the plate 266 by means of studs extending through openings in the channel member 262. Threaded shaft 286, rotatably mounted in the flanges of the channel member 262, cooperates with the threaded block 282 to move the block 282 crosswise of the channel member 262 as the shaft is turned by hand wheel 290, thereby changing the position of the hopper assembly and band feeding wheels and rolls. The band supports 166 are mounted directly to bar 292 extending between the block 282 and the block on the opposite side (not shown). The band stops 168 are slidable in the longitudinal direction with respect to the supports 166, and are fixed to the ends of the rods 294 which extend through openings in the bar 292. Each of the rods 294 are connected to a lever 296 which is keyed to shaft 298, by means of a link 300. Shaft 298 is supported from channel member 262 by means of brackets 302. A lever 304, keyed to shaft 298, communicates with the slidable plate 264 by means of pin 306. As the plate 264 aids in moving the band hopper and feeding mechanism horizontally one way, then, the shaft 298 will rotate in a direction to move the band stops 168 in the other direction, by means of the linkage between plate 264 and the stops 168. The distance between the feed assembly and the band stops 168 therefore increases, or decreases, as the hand wheel 290 is turned.

If the adhesive or gum for connecting the ends of the bands together has not already been applied to the bands, it is necessary to provide a mechanism for depositing an area of adhesive, gum, or the like to the ends of the bands as they are fed out of the hopper 170. Bands having areas of dry self-sealing adhesive, that is, adhesive that sticks to itself but not paper, may be used in banding the groups of envelopes, in which case all the necessary adhesive would be applied to the bands before they are put in the hopper. Such a band, having an area of self-sealing adhesive applied to it at both ends, on opposite sides so as to contact when the band ends are overlapped, may conveniently be used provided the adhesive areas do not extend to the edges of the band and cause sticking of the bands in the hopper. Such a band is shown in Semonsen Patent #2,096,352. However, it may be preferred to use a wet type of adhesive, and mechanism for applying this type of adhesive is illustrated in the drawings. An adhesive vessel 314 is located above the position of the lower band 164 in the hopper, and is mounted to an arm 316. The arm 316 is fixed to shaft 317, which is mounted above channel member 262 by brackets 318 and 320, for pivoting along a horizontal axis. The vessel 314 is provided with a tube 322 extending downwardly from its lower end. At the lower end of the tube, a small elongated opening 324 permits an area of adhesive to be deposited on a band when the opening 324 contacts a band. Due to the small size of the opening 324 and the viscosity of the adhesive, adhesive will not drip through the opening 324 when the vessel 314 is raised so that the opening 324 is unblocked.

The weight of the vessel 314 and arm 316 is normally supported by the tube 322 resting on the bands. It is during this time that the adhesive is deposited on the top band in the hopper 170. However, when the band feeding mechanism begins to operate to feed the top band into position on the supports 166, i.e. the feed wheels 176 and 178 begin to rotate, the cam 326, fixed to shaft 180, acts against cam follower 328 on arm 316 to raise the vessel 314, permitting the band on which adhesive has been deposited, to be freely removed from the hopper 170 by the feeding mechanism.

*Means for folding the band down the sides of the group*

With the group of envelopes to be banded resting in the banding station B, and the band 164 to be wrapped around the group now resting in place above the banding station B, the first band folding operation is ready to be performed. The first folds of the band 164 are made down across the sides or heights of the group by the vertical folding blades 338 and 340, which are mounted to the horizontal crossbar 342. Crossbar 342 is fixed to the end of the vertical rod 344, which is operated by the piston rod 346 of air cylinder 348 by means of crossbar 350. Air cylinder 348 is fixed to the top of the channel member 262. Strokes of the piston rod 346 therefore operate to move the blades 338 and 340 up or down along the outer sides of the blades 146, 148, 150, and 152.

The folding blades 338 and 340 are positioned on the crossbar 342 such that the inside faces thereof are substantially parallel to and spaced a slight distance from the sides of the group of envelopes held in the banding station B. Because the sides of the banding station B formed by the blades 150 and 152 may be adjusted to increase or decrease the size thereof, the folding blade 338 must also be adjustable, and means for adjusting blade 338 with respect to blades 150 and 152 are provided by the adjusting screw 352.

The folding blades 338 and 340, before folding a band, are retracted to their upper position, i.e. above the level of a band being held on the horizontal supporting members 166. This allows a band to be fed between the bottom of the folding blades 338 and 340 and the supporting members 166. When the folding blades 338 and 340 are lowered, they act to fold the band 164 down the sides of the group being held in the banding station B. The lower position of the folding blades 338 and 340 is such that the bottoms thereof partially cover the lower blades 148 and 152.

The crossbar 350 is fixed to the end of piston rod 346, and is guided during its movement between the upright bars 354 and 356. The rod 344 is slidable through a bore in crossbar 350. The lower position of the folding blades 338 and 340 is determined by the block 358, which is fixed to the end of rod 344, contacting the set screw 360. On the down stroke, the block 350 acts against spring 362 to push the folding blades 338 and 340 down until block 358 contacts the top of set screw 360. On the upstroke, block 350 pushes upward on the block 358. The rod 344 is also guided in its travel by the block 364 sliding along the upright rods 366 and 368.

*Means for folding the band across the bottom of the group*

The means for folding the free end of the band 164 across the bottom of the group in the banding station comprises the reciprocative sliding plate 138 which has been described hereinbefore as partially forming the bottom in the banding station B. The sliding plate 138 is mounted in the elongated opening 140 of the plate F, extending across the thickness of a group of envelopes in the banding station B.

Reciprocation of the sliding plate 138 is provided by air cylinder 378 mounted to the plate F. To conserve space, the air cylinder 378 is placed at right angles to the direction of movement of the sliding plate 138. Piston rod 380 of air cylinder 378 carries thereon a rack 382 which mates with pinion 384 of gear box 386. The output pinion 387 of gear box 386 mates with the rack 388 attached to sliding plate 138. Reciprocation of the piston rod 380 causes sliding plate 138 to reciprocate.

The normal position of the sliding plate 138 is such that a portion thereof extends under the banding station B forming a continuous bottom therein in conjunction with plate F. The folding edge 154 of sliding plate 138 in its normal position lies crosswise of the banding station and just under the blade 148.

After a group of envelopes has been moved to the banding station B to be banded, the sliding plate 138 is withdrawn, to the left as viewed in FIGURE 2, so that the band 164 may be folded down the sides of the group. The longer end of the band 164 will fall down into the opening 140 created by the withdrawn sliding plate 138. The sliding plate 138 is then returned to its normal position, and in doing so, folding edge 154 carries the free portion of the band across the bottom of the group.

*Means for connecting the ends of the band*

Figure 4:
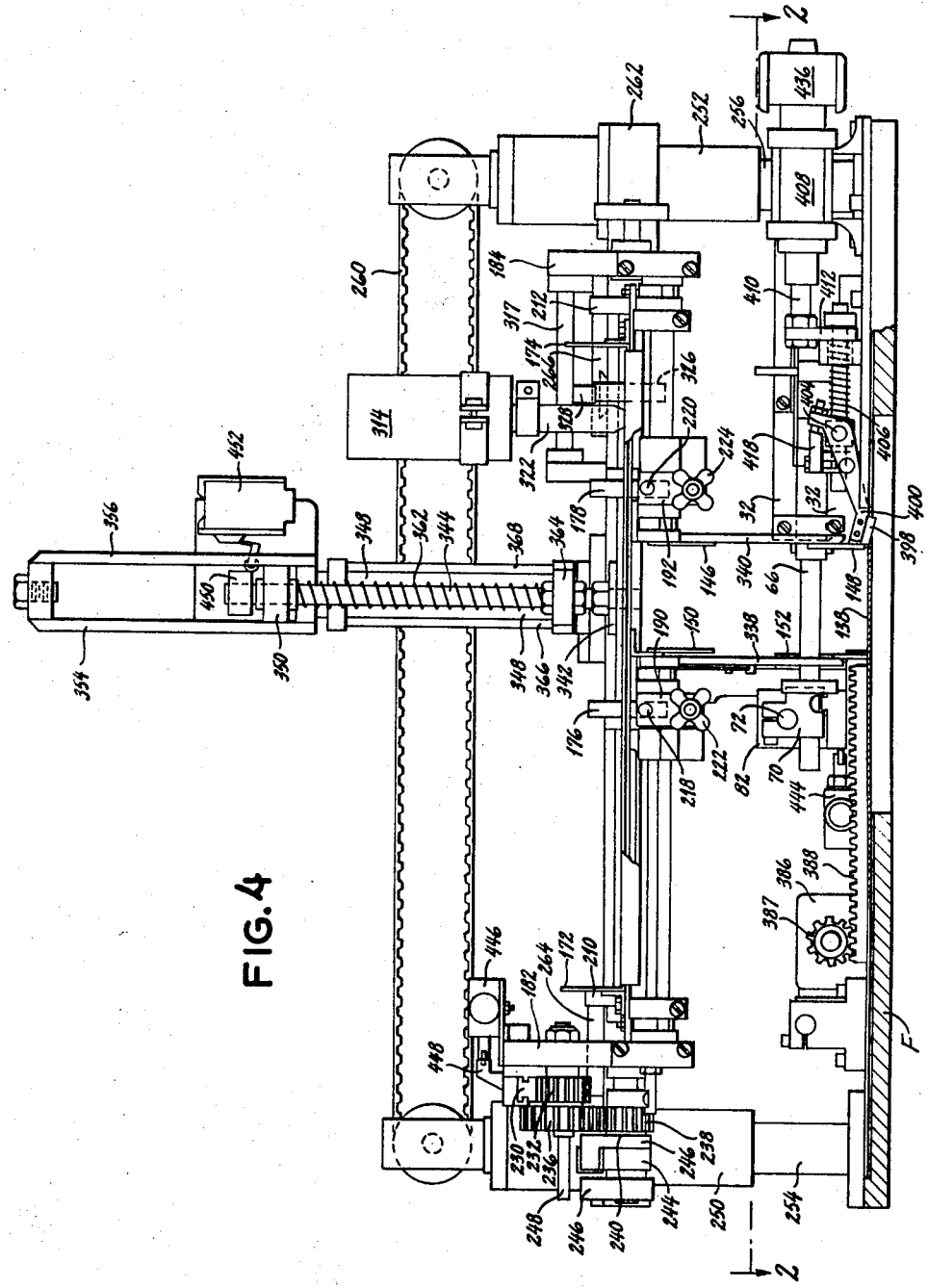
FIGURE 4 is an end elevation view of the machine.

To fold the free end of the band upward into overlying position with the gummed end of the band, to thereby connect the ends of the bands, suitable mechanism is provided as shown in FIGURES 2 and 4. A clamping bar 398 is mounted on arms 400 and 402 and adapted to pivot, about shaft 404, from a point below the position of the free end of the band after it has been folded across the bottom of the group, into firm contact with the gummed end of the band. The bar 398 presses the ends of the band together against the blade 148. The shaft 404 about which the arms 400 and 402 pivot, is carried at the end of horizontally reciprocating shaft 406. Horizontal reciprocating movement is imparted to shaft 406 by means of air cylinder 408. Piston rod 410 of air cylinder 408 is connected to shaft 406 by means of bracket 412.

The bar 398 is shown in clamping position in FIGURE 4 and in retracted, or lower position in FIGURE 2.

The arms 400 and 402 and the clamping bar 398 are balanced so that when piston rod 410 is retracted to draw the assembly to the right as viewed in FIGURE 2, the weight thereof will cause the clamping bar to pivot downward, through the opening 140 in plate F, or counterclockwise as viewed in FIGURE 4. However, when the assembly is moved to the left, the screws 414 and 416 which are adjustable in the arms 400 and 402, contact the crossbar 418. After contact is made by the screws 414 and 416 with the crossbar 418, further movement to the left will cause the arms to pivot clockwise about the shaft 404, to move upward into contact with the free end of the band 164 to fold it around the corner of the group of envelopes into firm engagement with the gummed end of the band 164 and against blade 148.

*Clearing the packaging station for the next cycle*

Once the band has been formed around the girth of the group, that is, across the top thickness, down across the sides or widths of the group, across the bottom thickness, and the ends of the bands are connected, the group is ready to be removed from the banding station B, to make room for the succeeding group. At this time, the side folding blades 338 and 340 are retracted upwardly away from the group, and the clamping bar 398 has now swung downwardly away from the clamping position holding the ends of the band together. Sliding plate 138, however, remains in position under the group. Notice from FIGURE 13 that the blades 146, 148, 150 and 152 are so adjusted as to apply some pressure on the sides of the group at locations along the sides and spaced from the longitudinal edges thereof. The group is somewhat compressed where acted upon by the blades 146, 148, 150 and 152, resulting in slight outward bulges at the corners of the group as well as the mid-portions thereof between the blades. The blades 146, 148, 150 and 152 are preferably of highly finished material, having a low coefficient of friction. The band 164 around the girth of the group is resting, to a relatively large extent, on parts of the group itself, and possibly somewhat against the sides of the blades. It is important that the band 164 rests firmly against portions of the envelopes in the group. When the succeeding group is transferred into the banding station B, the group already in the banding station will be displaced thereby, by the force of the incoming group. The band around the group in the banding station, frictionally engaged therewith will cling to this group and move in unison with it until the group is completely out from under the influence of the blades 146, 148, 150 and 152. Each so displaced group may then be picked up by a conveyor, by hand, or by other means and carried away.

*Operation*

The envelope handling machine according to this invention is conveniently operated by a system of air cylinders, as shown in the drawings, although it would appear possible to use other means for operating the machine.

Referring especially to the diagram shown in FIGURE 23 and the sequence views shown in FIGURES 15 through 22 (although the actual position of the air cylinders, switches, etc., are also shown in other drawings), there are five double-acting air cylinders which operate this machine. The air cylinders are each connected to a compressed air line 426, and operation of the individual cylinders is controlled by solenoid valves 428, 430, 432, 434 and 436 on cylinders 68, 226, 348, 378 and 408 respectively. The solenoid valves act to direct air from the line 426 into an end of the air cylinder (the internal piping and other components of the air cylinders being standard commercial equipment and not illustrated in the drawings), to move the piston either to one side or the other, to extend or retract the piston rods. The solenoid valves of the cylinders are wired to a source of electrical current, and leads thereto are provided with switches for controlling operation of the solenoids. The switches are conveniently located on the machine so that when an offset envelope is detected by the vacuum port 74, a chain of operations will be performed which will completely band a group of envelopes in the novel manner according to this invention.

Figure 15:
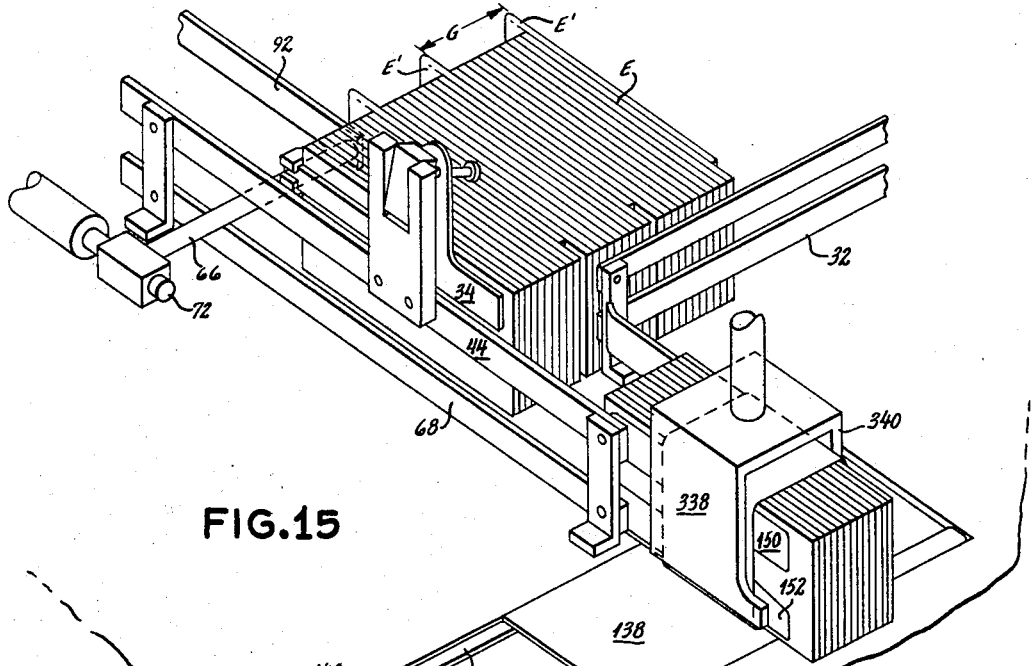

Just prior to the envelope handling machine going through a cycle, the envelope handling machine is in position as follows, as shown in FIGURE 15:

(a) Group transfer cylinder 68: Piston rod 72 is retracted, closing switch 438. However, pressure switch 89, in the same line as switch 438 is still open, and will only close to complete the circuit, when the vacuum port 74 is closed. Piston rod 72 is now holding the group transfer apparatus 14 in position alongside the edges of the envelopes in the succession, ready to remove the leading group G from the succession and transfer it to the banding station B.

(b) Band feed cylinder 226: Piston rod 228 is retracted, ready to move the rack 230 carried thereby in such a manner as to turn the band feeding wheels and rolls to feed a band onto the supports 166.

(c) Side folder cylinder 348: Piston rod 346 is retracted holding the side folding blades 338 and 340 down around the sides of the group in the banding station B.

(d) Clamping cylinder 408: Piston rod 410 is extended, holding clamping bar 398 closed, thereby holding the ends of the band 164 around a group already in the banding station B.

13

(e) Bottom folding cylinder 378: Piston rod 380 is extended, holding the sliding plate 138 in place under the group of previously banded envelopes.

Figure 16:
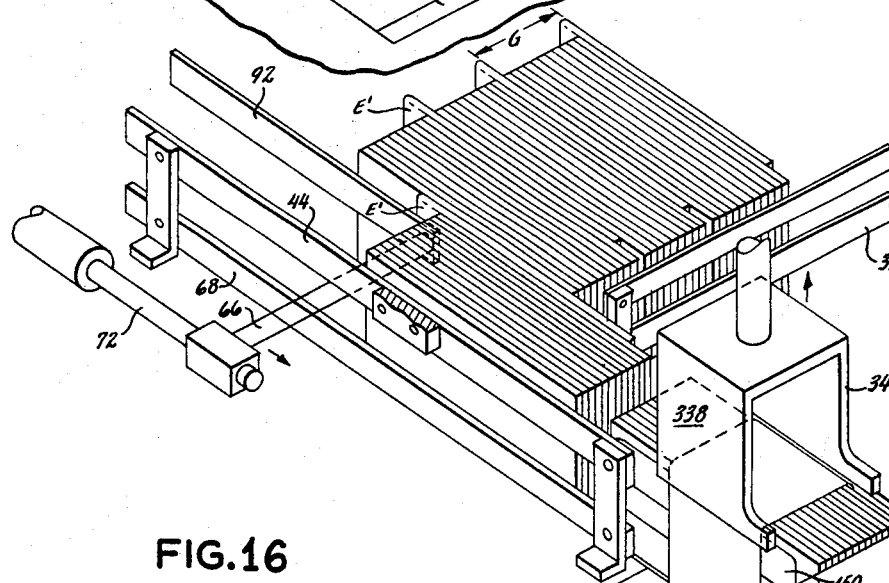

At this time, just prior to going into a cycle, vacuum is being drawn through port 74. Connected to the vacuum line 80 leading to port 74 is the line 90 leading to pressure switch 89. When the vacuum port 74 is closed by an offset envelope E', thereby closing the vacuum system from the atmosphere, the immediate drop in pressure in the vacuum lines closes pressure switch 89, to complete the circuits to solenoids 428, 430, 432 and 436. Note that the switch 438 in the same line as pressure switch 89 is already closed by the tripping bracket 442 on piston rod 72. Therefore, upon the closing of port 74 and the resulting closing of pressure switch 89, the following operations are performed simultaneously, as shown in FIGURE 16:

(a) The group transfer piston rod 72 starts forward to transfer the leading group of envelopes in the succession to the banding station B.

(b) The band feed piston rod 228 retracts to begin feeding a band 164 onto the supports 166 above the group to be banded. There is a slight delay in feeding the band after the band feed wheels begin to rotate, due to the location of the pads 194 and 196 on feed wheels 176 and 178. This delay allows the side folding blades 338 and 340 to retract to their upper positions out of the way of the band being fed.

(c) The side folder piston rod 346 extends to raise the side folding blades 338 and 340 to a position entirely above the group in the banding station B. The timing of this operation is such that the side folding blades 338 and 340 to a position entirely above the group in the banding station B. The timing of this operation is such that the side folding blades 338 and 340 will be entirely out of the way before the band is fed into position on the supports 166.

(d) The clamping bar piston rod 410 retracts to release the clamp 398 from holding the ends of the band of the previously packaged group together, to thereby free the band, allowing this previously packaged group to be pushed out of the banding station B by the group being transferred into it.

Figure 17:
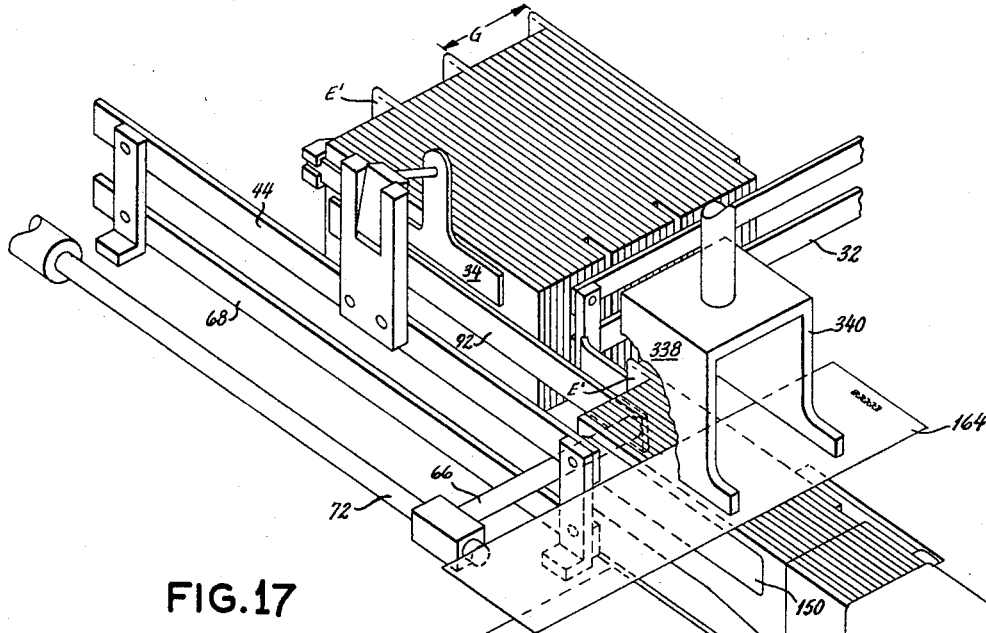

The positions of the various parts of the machine after the above movements is illustrated in FIGURE 17. However, when the group transfer piston rod 72 reaches the end of its stroke, placing the group to be banded in banding station B, the tripping bracket 442 closes switch 444 to complete circuits to solenoids 428, 430 and 434. Switch 446 is also closed on the retracting stroke of rod 228 by the tripping bracket 448 to complete a circuit to solenoid 432. Upon the closing of switch 444, the following operations are simultaneously performed as shown in FIGURE 18:

(a) The group transfer piston rod 72 starts to retract to its original position of placing the group transfer assembly alongside the succession of envelopes and waits for the next approaching offset envelope to close vacuum port 74 again.

Figure 18:
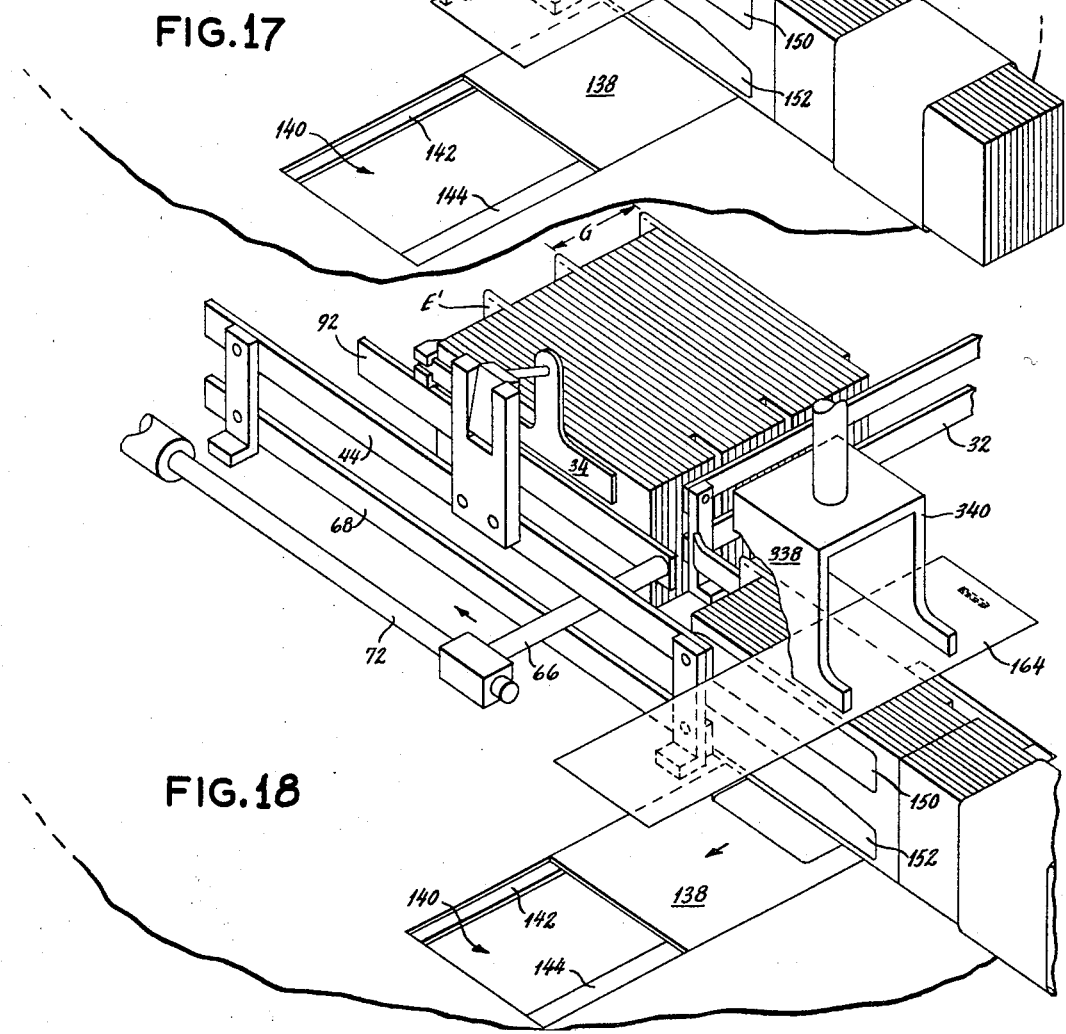

(b) Band feed piston rod 228 extends to be ready for feeding the next band (not shown in FIGURE 18).

(c) Bottom folder piston rod 380 retracts to move the sliding plate 138 out from under the group now in the banding station B, preparing for the band 164 to be folded down across the sides of the group, and receive the long end of the band 164 into the opening 140 formed by the retracted sliding plate 138.

Figure 19:
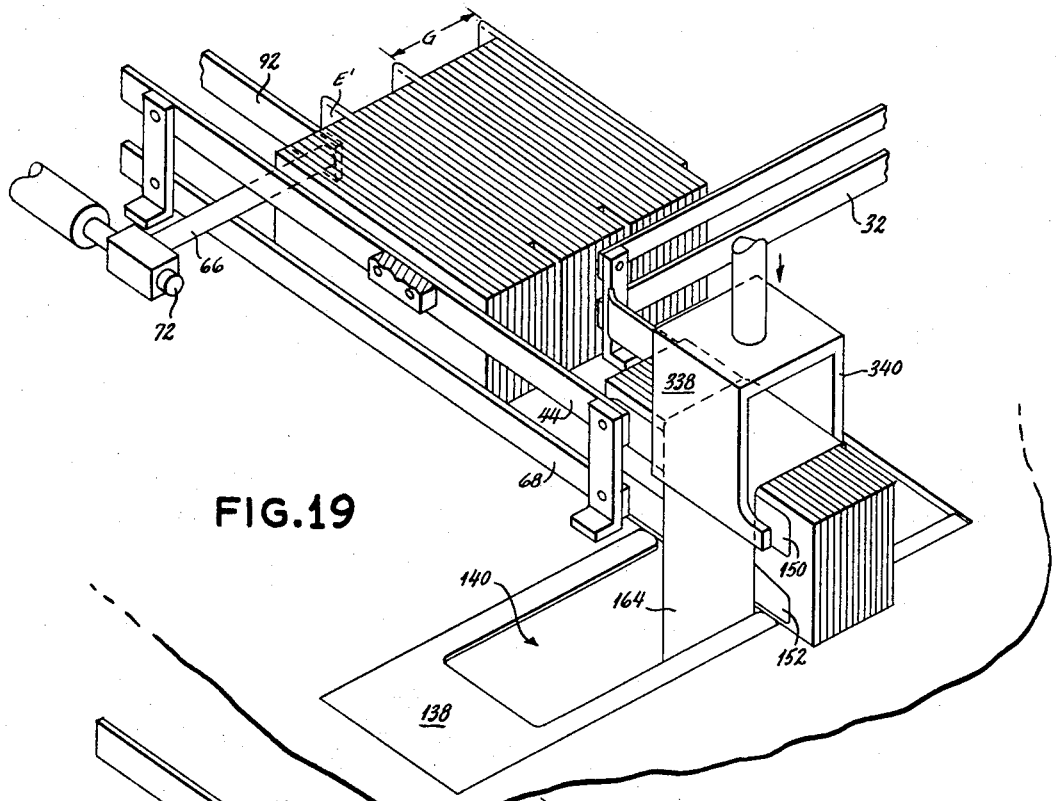

Upon the closing of switch 446 by bracket 448 on rod 228 at the end of its stroke, a circuit is completed to solenoid 432 to retract the side folder piston rod 346, thereby lowering the side folding blades 338 and 340 and folding the band down the sides of the group as shown in FIGURE 19. Side folder piston rod 346, in retracting, brings the tripping bracket 450 attached thereto into contact with switch 452 to thereby close

Figure 20:
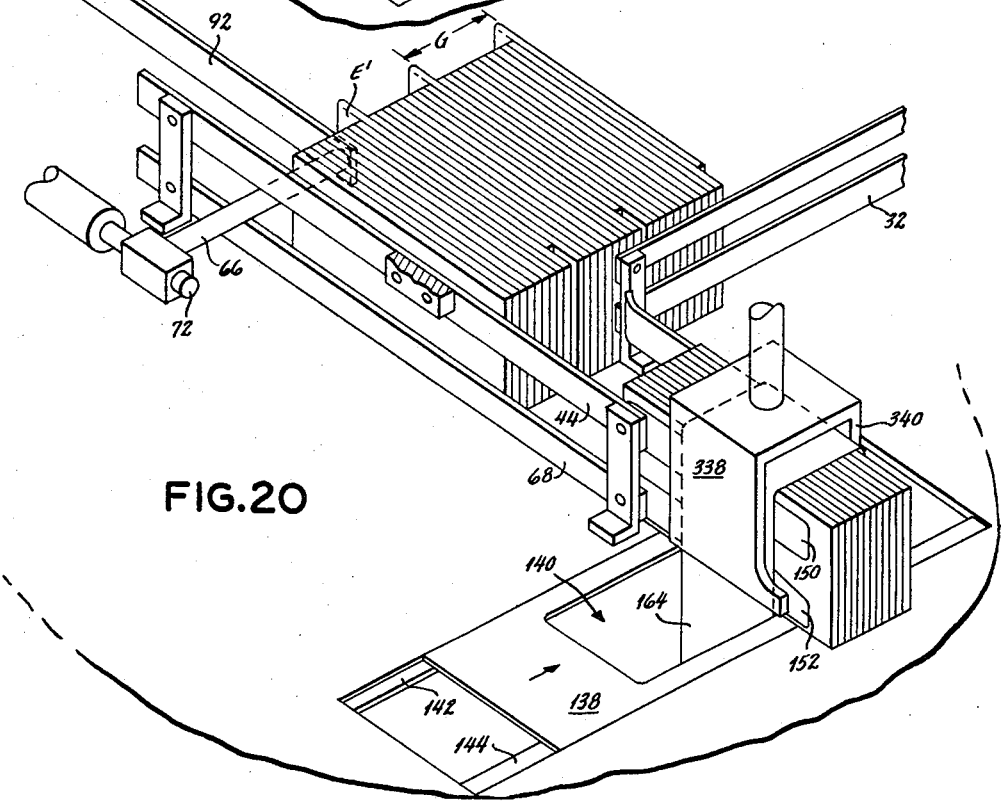
Figure 21:
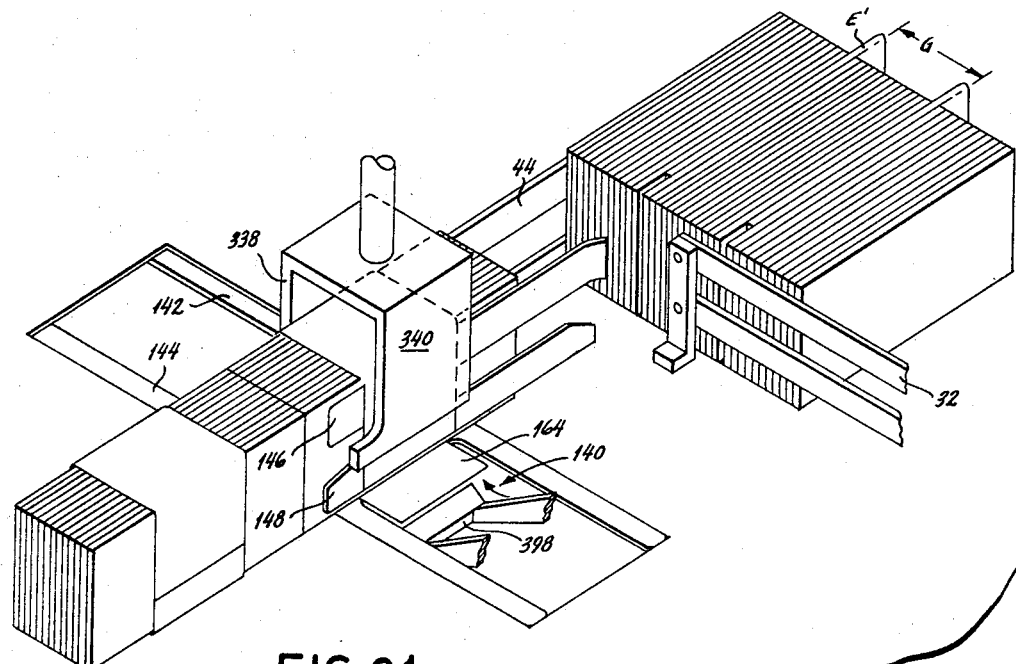

14 switch 452 to complete a circuit to solenoid 434. This causes piston rod 380 to extend to close the sliding plate 138 (bring it back to its position under banding station B), thereby folding the end of the band 164 hanging in opening 140 across the bottom of the group, as shown in FIGURE 20. The band 164 is then completely encircling the group, but the free end thereof is not clamped to the adhesive coated area of the other end. The machine at this stage is illustrated schematically in FIGURE 21.

Figure 22:
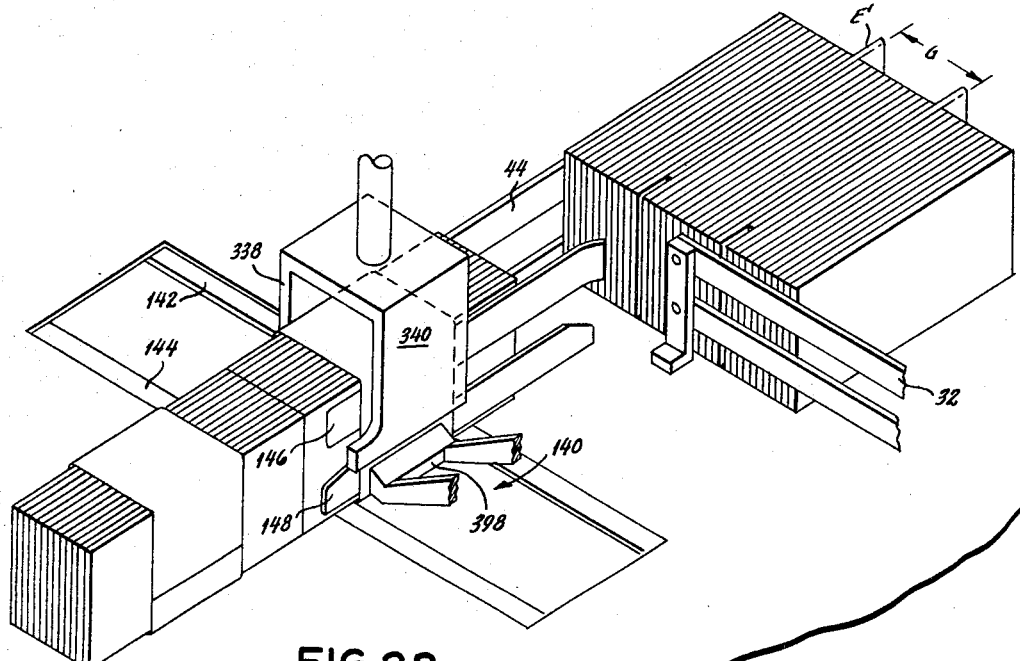

Just before the bottom folder piston rod 380 reaches the end of its stroke, i.e., extended position, the tripping bracket 454 closes switch 456 in passing, completing a circuit to solenoid 436, to thereby extend piston rod 410, closing the clamp 398 to fold the free end, or tip, of band 164 against the adhesive coating area as shown in FIGURE 22. The clamp 398 holds the ends of the band together until a new cycle of the machine begins. At this point the envelope handling machine is back in its original position, waiting for the next offset envelope to be detected to begin a new cycle. Switches 446, 452 and 456 are momentary contact switches and are only closed during passing of the respective tripping brackets in the directions indicated in the diagram in FIGURE 23.

FIGURES 24, 25 and 26 illustrate a modification of the invention which is especially effective when handling envelopes made of relatively light weight material, i.e., the typical air-mail weight envelope. In FIGURES 24, 25 and 26, there is shown a modified transfer mechanism for transferring leading groups of envelopes from the succession to the banding station. This modified form of the invention is different from the previously described embodiment in that upon each stroke of the transfer mechanism, the offset or count envelope which originally begins the cycle of operation is only moved back in alignment with the rest of the succession instead of being transferred to the banding station. Suitable mechanism is provided for releasing the count envelope in alignment with the rest of the succession while the remainder of the group to be packed is moved to the banding station.

As shown best in FIGURES 24 and 25, the transfer bar 66' and the vacuum grasping element 451 are separate members, but are so connected in operation that when the transfer bar 66' cycles through a transfer and return stroke (carrying envelopes from the succession to the banding station) the vacuum grasping element 451 which is holding the offset envelope E' moves through a much shorter stroke, i.e., only far enough to place the envelope which it is holding into alignment with the rest of the succession.

Mechanism for carrying out the above operation includes the transfer bar 66' and bar 92', which are fixed together as before, and the vacuum gripper element 451 which, in this embodiment of the invention, is a separate member from the transfer bar 66'. Bar 92' is provided with a longitudinally extending slot 453 into which the gripper element 451 fits. The gripper element 451 is supplied with vacuum through the vacuum line 80', and may be regulated by slide valve means as hereinbefore described. Element 451 is provided with opening 76' connected to the vacuum line 80' at one end, and terminating at the vacuum port 74' at the other end.

The transfer bar 66' is operated by an air cylinder in the same manner as previously described. The gripper element 451 is fixed to pin 455 by means of bracket 457. Pin 455 is slidably mounted in brackets 458 and 460. Pin 455 is provided with the bracket 462 which supports set screw 464. Set screw 464 rests against the end of bar 92'. Spring 466 tends to urge the pin in the direction of the envelopes by acting on the collar 468. The other end of the spring 466 acts against the bracket 460. Thus, with correct adjustment of the nut 470 along the threads of pin 455, the length of travel of the gripper element 451 can be made equal to the amount of protrusion of the count or offset envelope E'. A spring loaded pad of rubber 472 rests on the top edges of the envelopes and aids in preventing movement of the envelopes ahead of those being transferred to the packaging station.

A principal advantage of this embodiment of the invention in handling envelopes of light weight material, is the fact that there is less tendency for the envelopes being transferred to bend or buckle because the means for holding the adjacent upstream envelopes back (132 as hereinbefore referred to in FIGURE 2) is no longer necessary. Under certain conditions, the strip of material 132 may have a tendency to cause lightweight envelopes to buckle by the drag exerted thereon. In the embodiment of the invention shown in FIGURES 24, 25, and 26, no means (such as strip 132) is required to hold the adjacent upstream envelopes back, because the envelope E' just ahead of those being transferred is being held in alignment with the rest of the succession by the gripper element 451. The count of the groups which are transferred remains the same, of course, since the offset envelopes which are left behind are added to the next group. FIGURE 26 illustrates, in a manner similar to the illustrations of FIGURES 15 through 22 inclusive, how the envelopes in front of the offset count envelope are pushed away from the rest of the succession into the packaging station by means of the transfer bar 66', while envelope E' is being held behind in alignment with the rest of the succession by means of the gripper element 451.

In operation, the leading offset envelope E' closes the vacuum port 74' when it reaches a predetermined point. As hereinbefore described, closing this vacuum port 74' causes an air cylinder to reciprocate the transfer bar 66', thereby pushing the envelopes lying in its path into the packaging station. When the transfer bar 66' begins its stroke to the left as viewed in FIGURES 24 and 25, set screw 464 is released so that the pin 455 to which the gripper element 451 is attached also moves to the left, thereby moving the offset envelope E'. The pin is only allowed to move in this direction until the nut 470 contacts the bracket 460. This length of travel is just enough to position the offset envelope in alignment with the rest of the succession. The transfer bar 66' continues to travel to the left, while the bar 92' slides past the now stationary gripper element 451. The vacuum in the gripper element 451 continues to hold the envelope E' until the envelopes being transferred have completely passed. On the return stroke, the end of bar 92' contacts the set screw 464 and causes the gripper element 451 to return to a position to intercept the next offset envelope.

It will be understood that various changes in the details, materials, steps and arrangements of parts, which have been herein described and illustrated in order to explain the nature of the invention, may be made by those skilled in the art within the principle and scope of the invention as expressed in the appended claims.

We claim:

1. In combination with a machine having means for advancing a continuous succession of envelopes on their edges along a path perpendicular to the planes of the envelopes, the improvement of means for constantly feeding individual envelopes into the upstream end of the succession and withdrawing groups of envelopes to be packaged from the downstream end of the succession while maintaining the succession under moderate and substantially constant compression which comprises:
   (a) Back-pressure exerting means disposed in the path of the advancing succession, said means having a range of movement at least equal to the thickness of a group of envelopes to be packaged, a normal position at the upstream extremity of its range of movement, but being yieldable under a predetermined pressure exerted by the advancing succession to move forward at least a distance equal to the thickness of a group of envelopes to be packaged, and
   (b) means positioned within the range of movement of said back-pressure exerting means for laterally transferring the forward-most group of envelopes in the succession upon advancement of said group to a predetermined point into a packaging station, said station having means for exerting a predetermined pressure on said group.

2. Apparatus according to claim 1 in which the back-pressure exerting means comprises a plate having a surface situated in a plane substantially parallel to the faces of the envelopes in the succession.

3. In combination with a machine having means for advancing a continuous succession of envelopes on their edges along a path perpendicular to the planes of the envelopes with certain spaced apart envelopes in the succession being laterally offset designating the rear-most envelopes of adjacent groups destined to be packaged, the improvement which comprises
   (a) means disposed in the normal path of the envelopes for determining the forward-most position of the leading envelope in said succession,
   (b) means disposed out of the normal path of the envelopes, and in the path of the protruding portion of said laterally offset envelopes at a point upstream from said forward-most position a distance approximately equal to the thickness of the group to be packaged for detecting the presence of and engaging the leading offset envelope in said succession, and
   (c) means responsive to the detection and engagement of said leading offset envelope, and simultaneously pushing the remainder of said group by acting on the lateral edges thereof, in a direction parallel to the planes of the individual envelopes of the groups away from the succession into a packaging station.

4. Apparatus according to claim 3 in which the means for detecting the presence of and engaging the leading offset envelope in the succession comprises a member having a vacuum port adapted to be closed by the presence of the protruding portion of said laterally offset envelope.

5. Apparatus according to claim 3 in which the means for transferring the leading group of envelopes from the succession to the packaging station includes a member having a surface normally positioned adjacent the lateral edges of the forward-most envelopes in said succession, said member being reciprocal in a direction perpendicular to the path of the succession of envelopes upon the detection and engagement of an offset envelope.

6. In combination with a machine having means for advancing a continuous succession of envelopes on their edges along a path perpendicular to the planes of the envelopes with certain spaced apart envelopes in said succession being laterally offset designating the rear-most envelope of each successive group destined to be packaged, the improvement which comprises
   (a) back pressure exerting means disposed in the path of the advancing succession, said means having a range of movement at least equal to the thickness of a group of envelopes to be packaged, a normal position at the upstream extremity of its range of movement, but being yieldable under a predetermined pressure of the succession to move forward at least a distance equal to the thickness of a group of envelopes to be packaged,
   (b) means disposed out of the normal path of the succession and in the path of the protruding portion of said laterally offset envelopes at a point near the upstream extremity of the range of movement of said back pressure exerting means for detecting the presence of and engaging the leading offset envelope in said succession, and
   (c) means responsive to the detection and engagement of said leading offset envelope for moving said offset envelope, and simultaneously pushing the remainder of the group by acting on the lateral edges thereof, in a direction parallel to the planes of the individual envelopes of the groups away from the succession into a packaging station.

7. In combination with a machine having means for advancing a continuous succession of envelopes on their edges along a predetermined path perpendicular to the planes of the envelopes, with certain spaced apart envelopes in said succession being laterally offset designating the rear-most envelope of a group destined to be packaged, the improvement which comprises
- (a) means disposed in the normal path of the succession for determining the forward-most position of the leading envelope in the succession,
- (b) a packaging station offset from the position of the forward-most group of envelopes in said succession,
- (c) a detecting and transferring member having a surface normally positioned adjacent the lateral edges of the forward-most envelopes in said succession and a normally open vacuum port in the path of the forward-most offset envelope in the succession adapted to be closed by the presence of the protruding portion of the leading offset envelope,
- (d) means responsive to the closing of said vacuum port for reciprocating said detecting and transferring member in a direction perpendicular to the line of travel of said succession of envelopes, and
- (e) means providing suction to said vacuum port prior to and during the transfer stroke of said detecting and transferring member, and releasing the suction at the transfer stroke,
- (f) to thereby move said group from the forward-most position in said succession to said packaging station, release the group, and return to begin a new cycle.

8. Apparatus according to claim 7 in which the packaging station is offset from the position of the forward-most group of envelopes in said succession to the side of said succession opposite the side from which the offset envelopes protrude.

9. Apparatus according to claim 7 in which the group detecting and transferring member includes an L-shaped bar, one of the legs thereof providing the surface normally adjacent the edge of the forward-most stack of envelopes in the succession, and the other leg extending away from the succession and lying in a plane parallel to the planes of the envelopes in said succession, thereby providing a stop to prevent further forward movement of the succession of envelopes when said detecting and transfer member is in movement.

10. In combination with a machine having means for delivering enevelopes on edge and normally in alignment at the rear-most end of a succession, thereby advancing the forward end, and certain spaced apart envelopes being laterally offset to define one group destined to be packaged from another, the improvement of means for successively segregating groups of forwardmost envelopes for packaging which comprises
- (a) means for limiting the forward-most point of advancement of the succession,
- (b) means for detecting advancement to a predeterbined point in the succession, of the forward-most offset envelope, and
- (c) means responsive to said detection for pushing on side edges of the envelopes in the forward-most group destined to be packaged an amount sufficient to completely remove said forward-most group from the succession.

11. In combination with a machine having means for delivering envelopes on edge and normally in alignment at the rear-most end of a succession, thereby advancing the forward end, and certain spaced apart envelopes being laterally offset to define one group destined to be packaged from another the improvement of means for successively segregating groups of forward-most envelopes for packaging which comprises
- (a) means disposed in the path of advancement of said succession for maintaining the envelopes in upright position,
- (b) means for detecting advancement of the forward-most offset envelope to a predetermined point in the succession, and
- (c) means responsive to said detection for pushing on side edges of the envelopes in the forward-most group destined to be packaged an amount sufficient to completely remove said forward-most group from the succession.

12. In combination with a machine having means for delivering envelopes on edge and normally in alignment at the rear-most end of a succession, thereby advancing the forward end, and certain spaced apart envelopes being laterally offset to define one group destined to be packaged from another, the improvement of means for successively segregating groups of forward-most envelopes for packaging which comprises
- (a) means for limiting the forward-most point of advancement of the succession,
- (b) means disposed in the path of advancement of said succession for maintaining the envelopes in upright position,
- (c) means for detecting advancement of the forward-most offset envelope to a predetermined point in the succession, and
- (d) means responsive to said detection for pushing on side edges of the envelopes in the forward-most group destined to be packaged an amount sufficient to completely remove said forward-most group from the succession.

13. In combination with a machine having means for delivering envelopes on edge and normally in alignment at the rear-most end of a succession, thereby advancing the forward end, and certain spaced apart envelopes being laterally offset to define one group destined to be packaged from another, the improvement of means for successively segregating groups of forward-most envelopes for packaging which comprises
- (a) means disposed in the path of advancement of said succession for maintaining the envelopes in upright position,
- (b) means for detecting advancement of the forward-most offset envelope to a predetermined point in the succession, and
- (c) a group transfer bar positioned adjacent edges of the envelopes in the forward-most group and adapted to push the envelopes, by acting on their edges, away from the rest of the succession in response to said detection of the forward-most offset envelope.

14. In combination with a machine having means for delivering envelopes on edge and normally in alignment at the rear-most end of a succession, thereby advancing the forward end, and certain spaced apart envelopes being laterally offset to define one group destined to be packaged from another, the improvement of means for successively segregating groups of forward-most envelopes for packaging which comprises
- (a) means disposed in the path of advancement of said succession for maintaining the envelopes in an upright position,
- (b) grasping means laterally offset from the normal path of the envelopes in the succession, but within the path of the protruding portion of the offset envelope,
- (c) group transferring means extending from a position substantially flush with said grasping means forwardly in the direction of advancement of the succession and adjacent the lateral upright edges of the aligned envelopes,
- (d) means responsive to the grasping of an envelope by said grasping means for moving said group transferring means through a transferring and return stroke, said transferring stroke being of a length such as to completely move said forward-most group away from the rest of the succession, and
- (e) means responsive to the movement of said envelope transferring means for moving said grasping means a distance sufficient to place the envelope which it is grasping back into alignment with the rest of the succession, release it, and return to its original position.

15. In combination with a machine having means for delivering envelopes on edge and normally in alignment at the rear-most end of a succession, thereby advancing the forward end, and certain spaced apart envelopes being laterally offset to define one group destined to be packaged from another, the improvement of means for successively segregating groups of forward-most envelopes for packaging which comprises
 (a) means disposed in the path of advancement of said succession for maintaining the envelopes in an upright position,
 (b) grasping means laterally offset from the normal path of the envelopes in the succession, but within the path of the protruding portion of the offset envelope,
 (c) a group transfer bar extending from a point substantially flush with said grasping means forwardly in the direction of advancement of the succession, and in close proximity and substantially parallel to the lateral upright edges of the aligned envelopes forward of the forward-most offset envelope,
 (d) means responsive to the grasping of an envelope by said grasping means for moving said group transfer bar through a group transferring and return stroke, said bar being adapted to push on the lateral upright edges of the aligned envelopes forward of the forward-most offset envelope, and said transferring stroke being of a length sufficient to completely move said group away from the rest of the succession, and
 (e) means responsive to the movement of said envelope transfer bar for moving said grasping means a distance sufficient to place the envelope which it grasps back into alignment with the rest of the succession, release it, and return to its original position.

16. In combination with a machine having means for delivering envelopes on edge and normally in alignment at the rear-most end of a succession, thereby advancing the forward end, and certain spaced apart envelopes being laterally offset to define one group destined to be packaged from another, the improvement of means for successively segregating groups of forward-most envelopes for packaging which comprises
 (a) means disposed in the path of advancement of said succession for maintaining the envelopes in an upright position,
 (b) grasping means laterally offset from the normal path of the envelopes in the succession, but within the path of the protruding portion of the offset envelope,
 (c) a group transfer bar extending from a point substantially flush with said grasping means forwardly in the direction of advancement of the succession, and in close proximity and substantially parallel to the lateral upright edges of the aligned envelopes forward of the forward-most offset envelope,
 (d) means responsive to the grasping of an offset envelope by said grasping means for moving said group transfer bar and said grasping means through a group transferring and return stroke, said bar being adapted to push on the lateral upright edges of the aligned envelopes forward of the forward-most envelope and said grasping means being adapted to continue its hold on said offset envelope throughout the transferring stroke, said transferring stroke being of a length sufficient to completely move said group away from the rest of the succession.

References Cited

UNITED STATES PATENTS 2,697,236  12/1954  McCain _____ 214—8.5 X
2,698,693  1/1955  Nordquist _____ 214—8.5 X ROBERT G. SHERIDAN, *Primary Examiner.*

G. F. ABRAHAM, *Assistant Examiner.*